No. 630,629. Patented Aug. 8, 1899.
F. R. PACKHAM.
DISK FURROW OPENER.
(Application filed Mar. 28, 1899.)
(No Model.) 2 Sheets—Sheet 2.
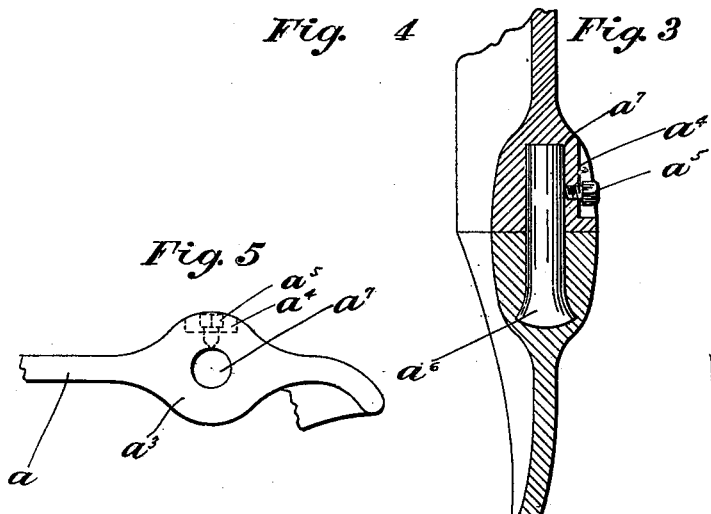
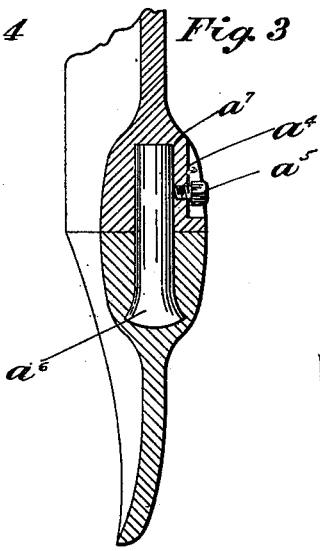
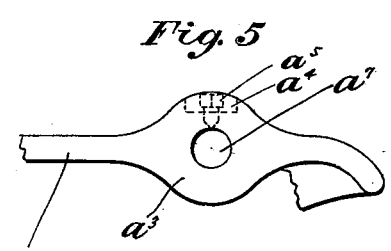
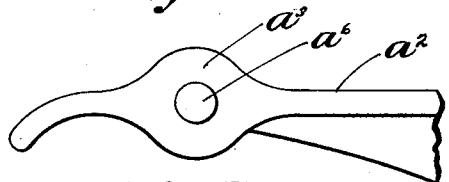
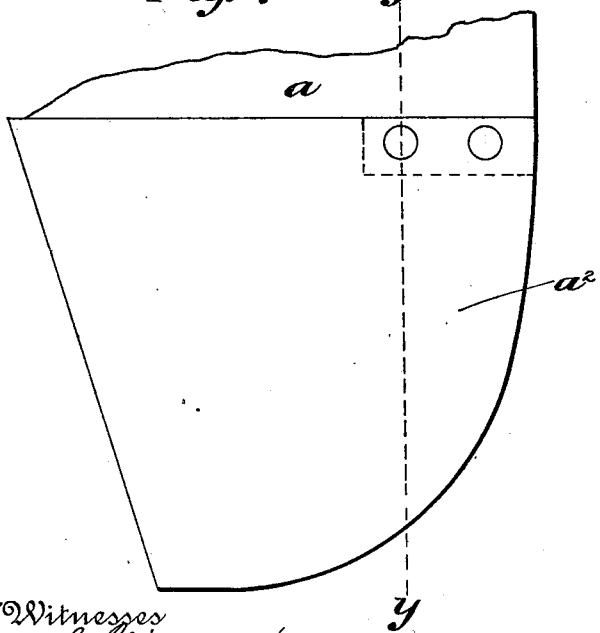
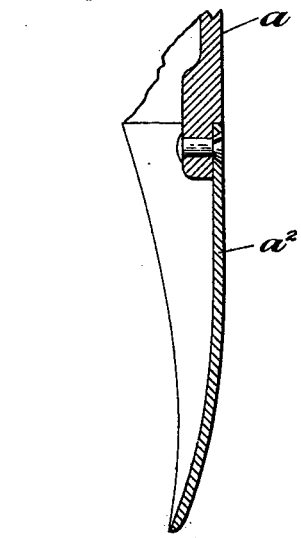
Witnesses
Harry G. Wiseman
Earl D. Welch
Inventor
Frank R. Packham
By his Attorney

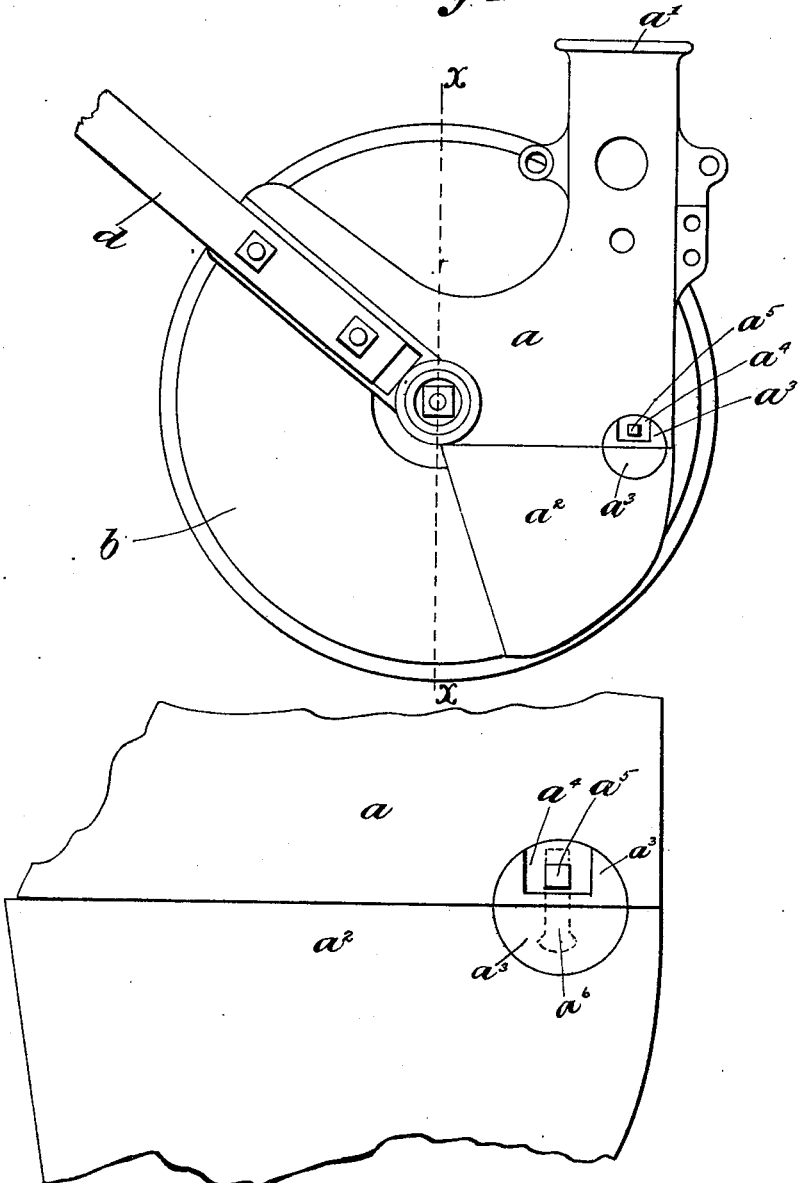

UNITED STATES PATENT OFFICE.

FRANK R. PACKHAM, OF SPRINGFIELD, OHIO, ASSIGNOR TO THE SUPERIOR DRILL COMPANY, OF SAME PLACE.

DISK FURROW-OPENER.

SPECIFICATION forming part of Letters Patent No. 630,629, dated August 8, 1899.

Application filed March 28, 1899. Serial No. 710,848. (No model.)

*To all whom it may concern:*

Be it known that I, FRANK R. PACKHAM, a citizen of the United States, residing at Springfield, in the county of Clark and State of Ohio, have invented certain new and useful Improvements in Disk Furrow-Openers, of which the following is a specification.

My invention relates to improvements in disk furrow-openers for seeding implements. It consists in the constructions and combinations of parts hereinafter described, and set forth in the claims.

The objects of my invention are to provide means whereby a definite relation between the position of the shield of my furrow-opener may be maintained and that said shield may be made to remain in close contact with the convex side of the disk, it being found important in certain soils that the shield shall not only act as a protection for the conduit, but that it shall further act as a scraper to scrape off closely lumps and films of mud that otherwise would pass up and find lodgment in the conduit.

In the accompanying drawings, Figure 1 is a side elevation of a device embodying my invention. Fig. 2 is a detail view of the same. Fig. 3 is a vertical sectional view of my device. Fig. 4 is a sectional view. Figs. 5 and 6 are detail views. Fig. 7 is a detail view; and Fig. 8 is a partial sectional view, on line $y\ y$ of Fig. 7, of a modification of the shield.

Like parts are represented by similar letters of reference in the several views.

In constructing my improved furrow-opener I employ a support $a$ for the furrow-opening disk $b$. Said support also carries a conduit $a'$, which is preferably formed integral therewith, and the support $a$ may be connected to the seeding implement by a suitable draw-bar $d$, which will be attached at its forward end in a well-known manner, the description of said parts being more fully set forth in my former patent, No. 601,477, dated March 29, 1896. As explained in said former patent, the disk $b$ is journaled at an angle to the horizontal, so that the disk is inclined to the vertical as well as to the line of travel. The result of this construction is that the lower edge of the disk has a tendency to cut under the soil and therefore lift up the soil at the rear and at a point near where the seed is deposited. In practice I have further found that it is desirable that the lower front or working edge of said shield should be kept from spreading out and by reason of obstructions and wear at the rear edge of said shield being thrown out of close contact with the convex side of the disk. I have further found it desirable to provide for the variations in degrees of the proximity of the shield to the back of the disk due frequently to the inaccuracies or discrepancies of adjustment in the process of manufacture.

For performing the objects or functions heretofore mentioned I have provided protective shields, one of which is shown in Figs. 1 to 7, being constructed of non-yielding material, and another form of shield or modification constructed of a yielding material. Where it is desirable to construct the shield of a non-yielding material, such as cast-iron, I preferably construct the shield $a^2$ separable from the support or conduit and form the lower part of the conduit $a'$ of a bulb shape, as shown in Figs. 3 and 5. At the upper rear edge of the shield, which is also formed of a bulb shape, as shown in Fig. 6, I have a trunnion $a^6$ formed integral with said shield and adapted to fit into the opening $a^7$ in the lower part of the conduit $a'$, which opening is formed in the rear edge of the conduit. The set-screw $a^5$, formed in the recessed opening $a^4$ at the rear edge of the conduit, is adapted to contact with the trunnion $a^6$, and thus fasten the shield to the conduit. In the modification showing the shield formed of the yielding material, such as steel, I rivet the shield to the conduit at its upper rear end, as shown in Fig. 7.

It will be seen that from the constructions as shown where a non-yielding material is used and the shield is fastened to the lower end of the conduit at its upper rear edge by means of the trunnion and set-screw, said shield may be adjusted at its front working edge in close contact with the convex side of the disk by loosening the set-screw and moving the front edge until it is adjusted to the desired position without effecting the opening at the rear of said disks. In the modifications shown the front edge can be moved into close contact with the convex edge of the disk by striking the edge sharply with a hammer or any other means. It will thus be seen that by either of the constructions shown the front edge of the shield is not subject to lateral displacement from the convex side of the disk by reason of obstructions on the rear edge of the disk, but any pressure or unusual strain exerted on the rear edge of the disks will not affect the position of the shield at the working edge of said shield, and in the constructions shown I have a self-adjusting protective shield which will tend to adjust itself in close contact with the convex side of the disk by obstructions or wear against the working edge of said shield.

Having thus described my invention, I claim—

1. In a furrow-opener the combination of a rotary disk, a shield formed independent of the support for said disk but fastened to same and capable of lateral self-adjustment to the convex side of the disk.

2. In a furrow-opener the combination of a rotary disk, a shield formed independent of the support for said disk, adjustable attaching devices for pivoting the shield at its rear end to the rear end of said support with its front edge free and adapted to cause said front edge to maintain itself in close contact with the convex side of the disk.

3. In a furrow-opener consisting of a support, a disk journaled to the line of draft and also with the plane of the disk at an angle to the line of draft, a conduit located at the rear of the support, a shield formed independent of said support but fastened at its rear end to the rear end of same with the front edge of said shield free and independent, said front edge being capable of self-adjustment to varying degrees of proximity to the disk.

4. In a furrow-opener, a support, a disk journaled to said support at an angle to the line of draft, a shield with a journal formed integral therewith at its upper rear end, and means for pivoting said journal in the lower end of the support and adapted to hold said shield rigid at its rear end with its working edge free and independent to permit a close adjustment of the working edge of said shield to the side of the disk.

5. In a furrow-opener a support, a disk journaled to said support at an angle to the line of draft, a shield, and adjustable means for fastening the rear end of the shield to the rear end of said support with the front edge of said shield free and independent and adapted to permit the free end of said shield to keep itself in close adjustment with said furrow-opener.

In testimony whereof I have hereunto set my hand this 18th day of March, A. D. 1899.

FRANK R. PACKHAM.

Witnesses:
EARL G. WELCH,
CHAS. I. WELCH.